June 5, 1962  F. T. CARROLL  3,037,713
CORN COB BIN AND DISINTEGRATOR
Filed Sept. 6, 1960  2 Sheets-Sheet 1

Frank T. Carroll
INVENTOR.

June 5, 1962  F. T. CARROLL  3,037,713
CORN COB BIN AND DISINTEGRATOR
Filed Sept. 6, 1960  2 Sheets-Sheet 2
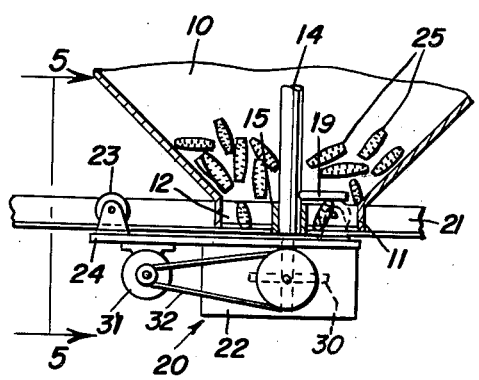
Frank T. Carroll
INVENTOR.

United States Patent Office 3,037,713
Patented June 5, 1962

3,037,713
CORN COB BIN AND DISINTEGRATOR
Frank T. Carroll, Rte. 1, Rochester, Ind.
Filed Sept. 6, 1960, Ser. No. 54,120
4 Claims. (Cl. 241—101)

This invention relates to new and useful improvements in bins particularly, although not necessarily, for corn cobs and husks, and has for its primary object to provide, in a manner as hereinafter set forth, a bin comprising novel means, operable by centrifugal force, for progressively loosening the cobs, etc., from the center outwardly, thus preventing clogging and ensuring the free, uniform discharge of the cobs and husks or other material.

Another very important object of the present invention is to provide a bin of the aforementioned character wherein the cobs, if desired, may be thoroughly crushed or disintegrated as they are discharged.

Other objects of the invention are to provide a self-unloading or emptying corn cob, etc., bin of the aforementioned character which will be comparatively simple in construction, strong, durable, compact and which may be manufactured and installed at low cost.

These together with other objects and advantages which will become subsequently apparent reside in the details of construction and operation as more fully hereinafter described and claimed, reference being had to the accompanynig drawings forming a part hereof, wherein like numerals refer to like parts throughout, and in which:

FIGURE 3 is a view in vertical section through the lower portion of the device, showing the cob reducer or disintegrater in operative position;

FIGURE 4 is a view in horizontal section, taken substantially on the line 4—4 of FIGURE 1;

FIGURE 5 is an elevational view of the lower portion of the device, taken at right angles to FIGURE 3;

FIGURE 6 is a bottom plan view of the cob disintegrater; and

FIGURE 7 is a fragmentary view in horizontal section, taken substantially on the line 7—7 of FIGURE 2.

Figure 1:
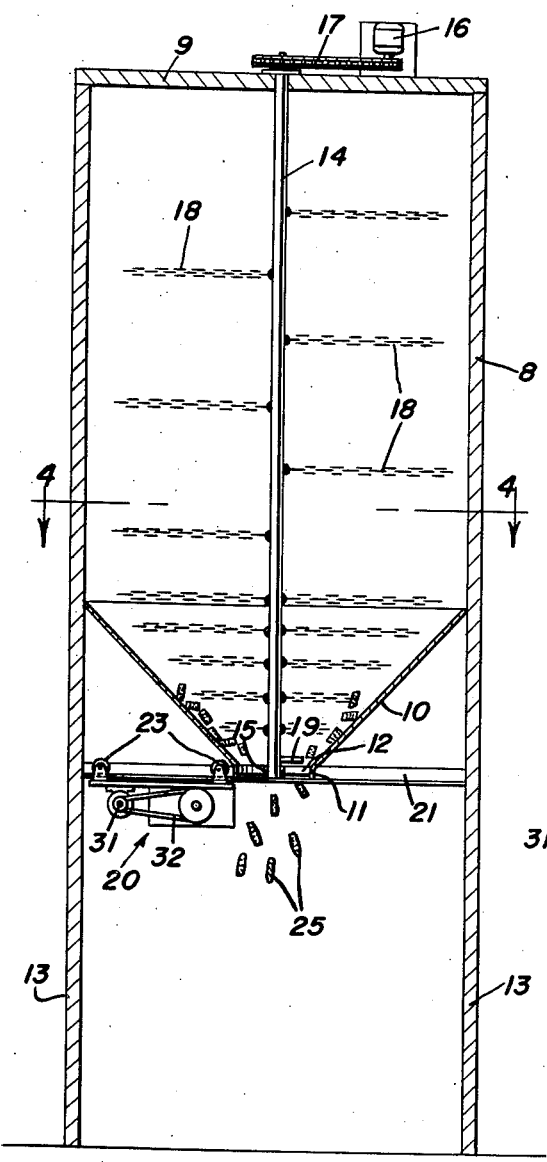
FIGURE 1 is a vertical sectional view through a corn cob bin constructed in accordance with the present invention, showing the device empty with the flexible agitators in extended position.

Referring now to the drawing in detail, it will be seen that the embodiment of the invention which has been illustrated comprises a cylindrical shell 8 of suitable material and capacity. The shell 8 includes a flat top 9 and an inverted frusto-conical hopper bottom 10. The hopper 10 terminates in a cylindrical neck 11 defining a circular discharge opening 12. Suitable supporting means 13 is provided for the shell 8.

Mounted centrally in the shell 8 is a vertical shaft 14. The lower end portion of the shaft 14 is journalled in a bearing 15 where it is mounted centrally in the discharge opening 12 on suitable hangers or arms. The upper end portion of the shaft 14 extends rotatably through the top 9 of the shell 8 and is driven from an electric motor 16 through a suitable chain and sprocket drive 17.

Mounted at spaced points on the shaft 14 for operation in the shell 8 and the hopper 10 thereof are flexible agitators 18. In the embodiment shown, the agitators 18 are in the form of chains of suitable metal. As shown to advantage in FIGURE 1 of the drawing, the agitators 18 which operate in the hopper 10 progressively decrease in length from the uppermost to the lowermost thereof. Closely adjacent to the discharge opening 12 the shaft 14 has fixed thereon a rigid agitator 19 for positively preventing the cobs from bridging and clogging said discharge opening.

A disintegrater 20 is provided for shredding or breaking up the cobs as they leave the hopper 10, if desired. The disintegrater 20 comprises a pair of spaced, parallel rails or tracks 21 of angle iron mounted on the supporting structure 13 and extending on opposite sides of the discharge opening 12. A case or housing 22 is suspended between the tracks 21 through the medium of rollers 23 which are operable on said tracks. In the embodiment shown, the case 22 is secured beneath a top plate 24 which carries the rollers 23. The plate 24 has formed therein a rectangular opening communicating with the case 22 for receiving the cobs from the hopper 10, as indicated at 25. The bottom 26 of the case 22 is provided with a rectangular discharge opening 27. Mounted in the case 22 on opposite walls thereof is a plurality of spaced stationary fingers or tines 28. A shaft 29 is journailed in the case 22 above the opening 27. Radiating from the shaft 29 are fingers or tines 30 which coact with the stationary fingers or tines 28 for disintegrating the cobs as they enter the case 22. An electric motor 31 is mounted beneath the plate 24. The motor 31 drives the shaft 29 through a belt and pulley connection 32.

Figure 2:
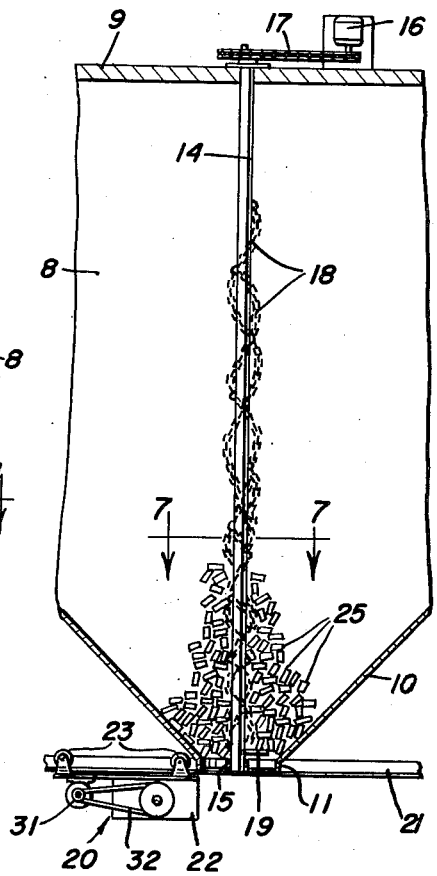
FIGURE 2 is a fragmentary view in vertical section of the device with the agitators in retracted position.

It is thought that the operation of the device will be readily apparent from a consideration of the foregoing. Briefly, when the bin or shell 8 is empty, the agitators 18 hang by gravity from their connections to the shaft 14. When the shell 8 is loaded the motor 16 is energized for actuating the shaft 14. When this occurs the flexible agitators 18 are caused to wrap spirally around the shaft 14. When thus wrapped tightly around the shaft the agitators revolve therewith and have very little resistance. However, there is enough agitating action at this stage to loosen the cobs and husks immediately around the shaft and they fall downwardly through the dischrage opening 12. As the hole in the center becomes larger the agitators unwrap from the shaft and swing outwardly by centrifugal force in a manner to continue to loosen the cobs and husks until the shell is empty. With the disintegrater 20 in retracted or inoperative position as shown in FIGURES 1 and 2 of the drawing, whole cobs emerge from the discharge opening 12. If crushed, shredded or broken-up cobs are desired, the unit 20 is shifted to operative position beneath the discharge opening 12 for receiving the cobs therefrom and the electric motor 31 is energized. The supporting arms or hangers for the shaft bearing 14 in the discharge opening 12 are indicated at 33. If desired, a closure or gate, operable by suitable means, may be provided for the discharge opening 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A corn cob disintegrator comprising a cylindrical bin for the reception of corn cobs, a supporting structure supporting the bin in an elevated position, a pair of spaced, parallel rails mounted horizontally on the supporting structure beneath the bin, a horizontal plate having an opening on one end portion thereof, laterally projecting rollers on opposite marginal side portions of the plate operable on the rails for suspending the plate therebetween, a case secured beneath the said one end portion of the plate in communication with the opening for receiving cobs from the bin, and cob shredding means in the case, said bin including a substantially inverted conical bottom having an outlet for the cobs between the rails, said plate being operable on the rails for moving the opening into or out of registry with the outlet.

2. An apparatus in accordance with claim 1, said shredding means including a shaft journaled in the case, and coacting metal tines on said shaft and said case.

3. An apparatus in accordance with claim 2, together with an electric motor secured beneatth the other end portion of the plate and operatively connected to the shaft.

4. An apparatus in accordance with claim 3, said case including a bottom having an opening therein for the discharge of the shredded cobs.

References Cited in the file of this patent

UNITED STATES PATENTS

| | | |
|---|---|---|
| 1,912,336 | Allen | May 30, 1933 |
| 2,228,421 | Taylor | Jan. 14, 1941 |
| 2,576,620 | Martin | Nov. 27, 1951 |
| 2,970,780 | Bowen | Feb. 7, 1961 |

FOREIGN PATENTS

| | | |
|---|---|---|
| 316,413 | Germany | Nov. 25, 1919 |
| 571,420 | Canada | Mar. 3, 1959 |
| 1,083,207 | France | June 23, 1954 |